(12) United States Patent
Jeong et al.

(10) Patent No.: US 12,461,816 B2
(45) Date of Patent: Nov. 4, 2025

(54) ELECTRONIC SYSTEM FOR MONITORING ERROR OF ADDRESS

(71) Applicant: SK hynix Inc., Icheon-si (KR)

(72) Inventors: Jin Ho Jeong, Icheon-si (KR); Saeng Hwan Kim, Icheon-si (KR); Mun Seon Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/587,385

(22) Filed: Feb. 26, 2024

(65) Prior Publication Data

US 2025/0123923 A1 Apr. 17, 2025

(30) Foreign Application Priority Data

Oct. 17, 2023 (KR) .......................... 10-2023-0139062

(51) Int. Cl.
*G06F 11/10* (2006.01)

(52) U.S. Cl.
CPC ...... *G06F 11/1068* (2013.01); *G06F 11/1004* (2013.01); *G06F 11/1016* (2013.01)

(58) Field of Classification Search
CPC ............. G06F 11/1068; G06F 11/1004; G06F 11/1016
See application file for complete search history.

(56) References Cited

U.S. PATENT DOCUMENTS

| | | | |
|---|---|---|---|
| 2008/0195888 A1* | 8/2008 | Shuma ................ | G06F 11/1008 714/E11.034 |
| 2016/0026524 A1* | 1/2016 | Hoya ....................... | G11C 7/12 714/764 |
| 2017/0364407 A1* | 12/2017 | Osada ..................... | G11C 29/44 |
| 2022/0199162 A1* | 6/2022 | Kim ........................ | G11C 7/04 |
| 2023/0063494 A1 | 3/2023 | Schaefer | |

FOREIGN PATENT DOCUMENTS

KR 20140083471 A 7/2014

\* cited by examiner

*Primary Examiner* — Thien Nguyen
(74) *Attorney, Agent, or Firm* — WILLIAM PARK AND ASSOCIATES LTD.

(57) ABSTRACT

An electronic system includes a controller configured to output a command, external row addresses, and external column addresses, receive a flag signal, and output the flag signal to a host. The electronic system also includes a semiconductor device configured to correct an error of internal data output from a memory cell selected based on the command, the external row addresses, and the external column addresses to output error-corrected internal data as data, and output the flag signal that is enabled when correcting the error in the internal data a set number of times.

22 Claims, 14 Drawing Sheets

FIG. 9

| INPUT | CNT<2> | CNT<1> |
|---|---|---|
| 1st CMP | L | H |
| 2nd CMP | H | L |
| 3rd CMP | H | H |
| RST | L | L |

ELECTRONIC SYSTEM FOR MONITORING ERROR OF ADDRESS

CROSS-REFERENCE TO RELATED APPLICATIONS

The present application claims priority under 35 U.S.C. 119(a) to Korean Patent Application No. 10-2023-0139062, filed on Oct. 17, 2023, in the Korean Intellectual Property Office, which is incorporated herein by reference in its entirety.

BACKGROUND

1. Technical Field

The present disclosure relates to an electronic system that monitors error occurrence in real time by providing a flag signal generated when error correction of internal data output for each of the same row address and the same column address is performed a set number of times to a host.

2. Related Art

Recently, DDR2, DDR3, DDR4, and DDR5 methods, which input/output multiple bits of data per clock cycle, are being used to increase the operating speed of a semiconductor device. Because the probability of errors occurring during data transmission increases when the data input/output speed increases, additional devices and methods are required to ensure the reliability of data transmission.

A method is used to ensure the reliability of data transmission by generating an error check code that can check whether an error has occurred each time data is transmitted and transmitting the error check code along with the data. The error check code includes an error detection code (EDC), which can detect errors that have occurred, and an error correction code (ECC), which can self-correct when an error occurs.

SUMMARY

In accordance with an embodiment of the present disclosure, an electronic system may include a controller configured to output a command, external row addresses, and external column addresses, receive a flag signal, and output the flag signal to a host. The electronic system may also include a semiconductor device configured to correct an error of internal data output from a memory cell selected based on the command, the external row addresses, and the external column addresses to output error-corrected internal data as data, and output the flag signal that is enabled when correcting the error in the internal data a set number of times.

In addition, in accordance with another embodiment of the present disclosure, a semiconductor device may include an error correction circuit configured to correct an error of internal data, based on the internal data output from a memory cell selected based on row addresses and column addresses and an internal parity to generate data, and generate a correction enable signal when the error of the internal data is correctable. The semiconductor device may also include a fail detection circuit configured to latch the column addresses having different combinations in one combination of the row addresses whenever the correction enable signal is enabled, and generate a flag signal that is enabled when the column addresses are latched a set number of times.

In addition, in accordance with another embodiment of the present disclosure, a semiconductor device may include an error correction circuit configured to correct an error of internal data, based on the internal data output from a memory cell selected based on row addresses and column addresses and an internal parity to generate data, and generate a correction enable signal when the error of the internal data is correctable. The semiconductor device may also include a fail detection circuit configured to latch the row addresses having different combinations in one combination of the column addresses whenever the correction enable signal is enabled, and generate a flag signal that is enabled when the row addresses are latched a set number of times.

BRIEF DESCRIPTION OF THE DRAWINGS

FIG. 9 is a table illustrating an operation of the flag signal generation circuit shown in FIG. 8.

DETAILED DESCRIPTION

In the following description of embodiments, when a parameter is referred to as being "predetermined," it may be intended to mean that a value of the parameter is determined in advance when the parameter is used in a process or an algorithm. The value of the parameter may be set when the process or the algorithm starts or may be set during a period in which the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage corresponds to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

The term "logic bit set" may mean a combination of logic levels of bits included in a signal. When the logic level of each of the bits included in the signal is changed, the logic bit set of the signal may be set differently. For example, when the signal includes two bits, when the logic level of each of the two bits included in the signal is "logic low level, logic low level", the logic bit set of the signal may be set as the first logic bit set, and when the logic level of each of the two bits included in the signal is "a logic low level and a logic high level", the logic bit set of the signal may be set as the second logic bit set.

Various embodiments of the present disclosure will be described hereinafter in more detail with reference to the accompanying drawings. However, the embodiments described herein are for illustrative purposes only and are not intended to limit the scope of the present disclosure.

Figure 1:
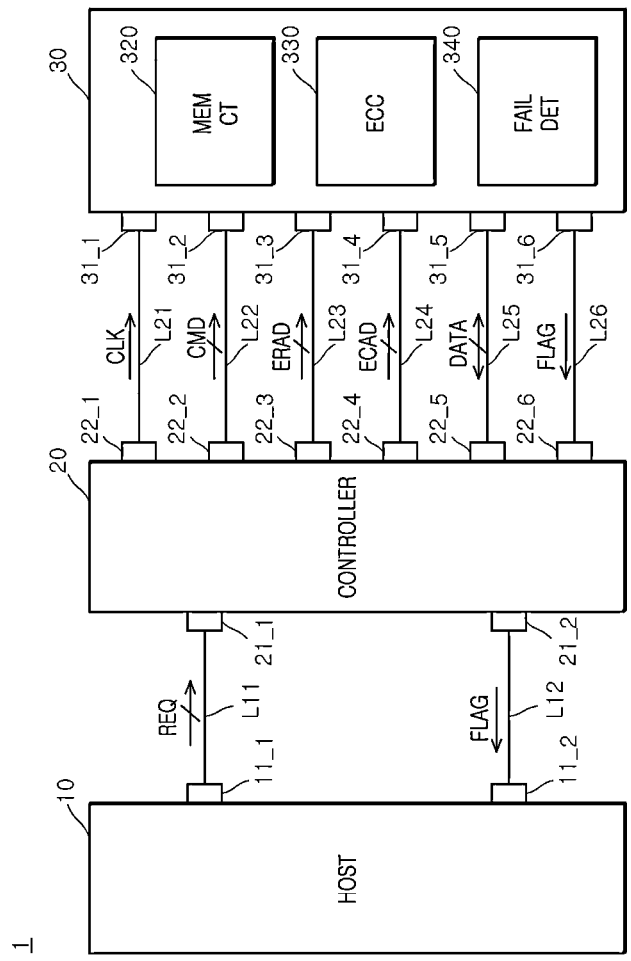
FIG. 1 is a block diagram illustrating a configuration of an electronic system according to an embodiment of the present disclosure.

FIG. 1 is a block diagram illustrating a configuration of an electronic system 1 according to an embodiment of the present disclosure. As shown in FIG. 1, the electronic system 1 may include a host 10, a controller 20, and a semiconductor device 30.

The host 10 may include a first host pin 11_1 and a second host pin 11_2. The controller 20 may include a first control pin 21_1, a second control pin 21_2, a third control pin 22_1, a fourth control pin 22_2, a fifth control pin 22_3, a sixth control pin 22_4, a seventh control pin 22_5, and an eighth control pin 22_6. The semiconductor device 30 may include a first device pin 31_1, a second device pin 31_2, a third device pin 31_3, a fourth device pin 31_4, a fifth device pin 31_5, and a sixth device pin 31_6. A first transmission line L11 may be connected between the first host pin 11_1 and the first control pin 21_1. A second transmission line L12 may be connected between the second host pin 11_2 and the second control pin 21_2. A third transmission line L21 may be connected between the third control pin 22_1 and the first device pin 31_1. A fourth transmission line L22 may be connected between the fourth control pin 22_2 and the second device pin 31_2. A fifth transmission line L23 may be connected between the fifth control pin 22_3 and the third device pin 31_3. A sixth transmission line L24 may be connected between the sixth control pin 22_4 and the fourth device pin 31_4. A seventh transmission line L25 may be connected between the seventh control pin 22_5 and the fifth device pin 31_5. An eighth transmission line L26 may be connected between the eighth control pin 22_6 and the sixth device pin 31_6.

The host 10 may transmit a request signal REQ to the controller 20 through the first transmission line L11. The host 10 may receive a flag signal FLAG from the controller 20 through the second transmission line L12. The request signal REQ may be set as a signal including a plurality of bits for generating a command and an address during write and read operations.

The controller 20 may transmit a clock CLK to the semiconductor device 30 through the third transmission line L21. The controller 20 may transmit a command for controlling the semiconductor device 30 to the semiconductor device 30 through the fourth transmission line L22, based on the request signal REQ. The controller 20 may transmit external row addresses ERAD for controlling the semiconductor device 30 to the semiconductor device 30 through the fifth transmission line L23, based on the request signal REQ. The controller 20 may transmit external column addresses ECAD for controlling the semiconductor device 30 to the semiconductor device 30 through the sixth transmission line L24, based on the request signal REQ. The controller 20 may transmit data DATA to the semiconductor device 30 through the seventh transmission line L25 during a write operation, based on the request signal REQ. The controller 20 may also receive the data DATA from the semiconductor device 30 through the seventh transmission line L25 during a read operation, based on the request signal REQ. The controller 20 may receive the flag signal FLAG from the semiconductor device 30 through the eighth transmission line L26. The controller 20 may output the flag signal FLAG to the host 10 through the second transmission line L12.

The clock CLK may be set as a signal that is toggled periodically to synchronize the operations of the controller 20 and the semiconductor device 30. The command CMD may be set as a signal including a plurality of bits and controlling the operations of the semiconductor device 30. Each of the external row addresses ERAD and the external column addresses ECAD may be set as a signal including a plurality of bits and selecting a plurality of memory cells (MCs in FIG. 2) included in a memory circuit 320. The data DATA may be set as general data including a plurality of bits and input and output to and from the memory circuit 320. The flag signal FLAG may be set as a signal that is enabled when an error in internal data (ID<1:8> in FIG. 2) output by the external column addresses ECAD having different combinations in one combination of the external row addresses ERAD is corrected a set number of times. The flag signal FLAG may be set as a signal that is enabled when the error in the internal data (ID<1:8> in FIG. 2) output by the external row addresses ERAD having different combinations in one combination of the external column addresses ECAD is corrected the set number of times, depending on embodiments. The semiconductor device 300, for example, may enable flag signal FLAG.

The semiconductor device 30 may include the memory circuit 320, an error correction circuit 330, and a fail detection circuit 340.

The memory circuit 320 may store the internal data (ID<1:8> in FIG. 2) generated from the data DATA in the memory cell (MC in FIG. 2) selected by the external row addresses ERAD and the external column addresses ECAD during a write operation, based on the command CMD. The memory circuit 320 may output the internal data (ID<1:8> in FIG. 2) and internal parities (IP<1:3> in FIG. 2) stored in the memory cell (MC in FIG. 2) selected by the external row addresses ERAD and the external column addresses ECAD during a read operation, based on the command CMD.

The error correction circuit 330 may correct the error of the internal data (ID<1:8> in FIG. 2), based on the internal data (ID<1:8> in FIG. 2) and the internal parities (IP<1:3> in FIG. 2) to generate the data DATA during the read operation. The error correction circuit 330 may generate a correction enable signal (CE in FIG. 2) when the error in the internal data (ID<1:8> in FIG. 2) is correctable during the read operation.

The fail detection circuit 340 may latch row addresses (RAD<1:L> in FIG. 2) generated from the external row addresses ERAD and column addresses (CAD<1:M> in FIG. 2) generated from the external column addresses ECAD. The fail detection circuit 340 may latch the plurality of column addresses (CAD<1:M> in FIG. 2) having different combinations in one combination of the row addresses (RAD<1:L> in FIG. 2) whenever the correction enable signal (CE in FIG. 2) is enabled. The fail detection circuit 340 may latch the plurality of row addresses (RAD<1:L> in FIG. 2) having different combinations in one combination of the column addresses (CAD<1:M> in FIG. 2) whenever the correction enable signal (CE in FIG. 2) is enabled. The fail detection circuit 340 may generate pre-row addresses (P_RAD<1:L> in FIGS. 5 and 12) and pre-column addresses (P_CAD<1:M> in FIGS. 7 and 11), based on the latched row addresses (RAD<1:L> in FIG. 2) and column addresses (CAD<1:M> in FIG. 2), respectively. The fail detection circuit 340 may compare the row addresses (RAD<1:L> in FIG. 2) and the column addresses (CAD<1:M> in FIG. 2) with the pre-row addresses (P_RAD<1:L> in FIGS. 5 and 12) and the pre-column addresses (P_CAD<1:M> in FIGS. 7 and 11), respectively, to generate the flag signal FLAG when the correction enable signal (CE in FIG. 2) is enabled. The fail detection circuit 340 may output the flag signal FLAG to the controller 20.

The semiconductor device 30 may correct the error of the internal data (ID<1:8> in FIG. 2) output from the memory cell (MC in FIG. 2) selected by the external row addresses ERAD and the external column addresses ECAD during the read operation, based on the command CMD to output error-corrected internal data (ID<1:8> in FIG. 2) as the data DATA. The semiconductor device 30 may output the flag signal FLAG that is enabled when correcting the error of the internal data (ID<1:8> in FIG. 2) output by the same external row address ERAD and the same external column address ECAD a set number of times to the controller 20.

Figure 2:
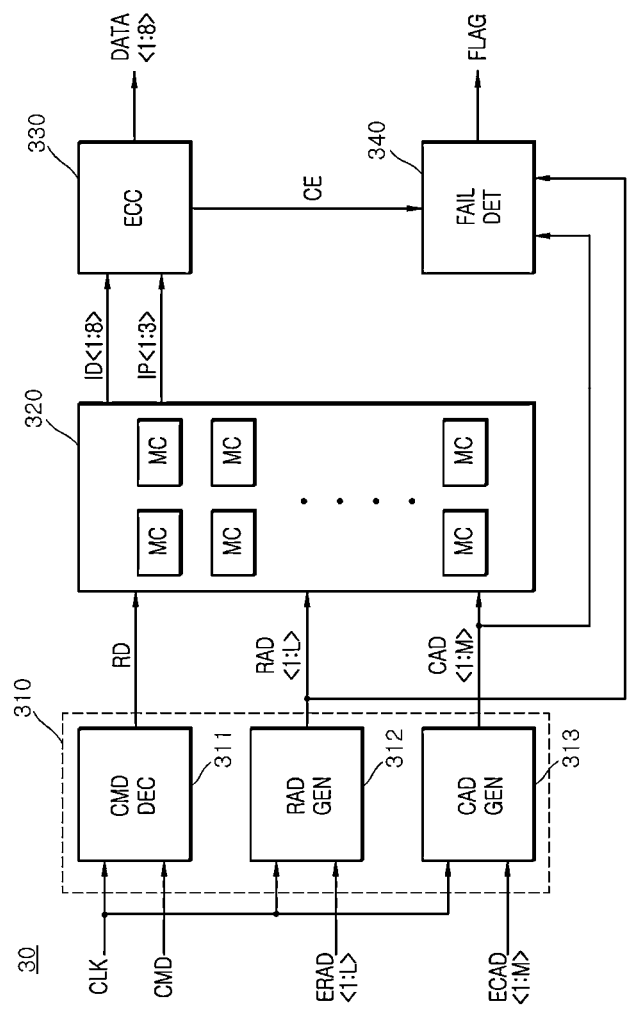
FIG. 2 is a block diagram illustrating a configuration according to an embodiment of a semiconductor device included in the electronic system shown in FIG. 1.

FIG. 2 is a block diagram illustrating a configuration according to an embodiment of the semiconductor device 30 included in the electronic system 1 shown in FIG. 1. The semiconductor device 30 may include an input circuit 310, a memory circuit 320, an error correction circuit 330, and a fail detection circuit 340.

The input circuit 310 may include a command decoder 311, a row address generation circuit 312, and a column address generation circuit 313.

The command decoder 311 may receive the command CMD in synchronization with the clock CLK. The command decoder 311 may decode the command CMD in synchronization with the clock CLK to generate a read signal RD for performing a read operation. The command CMD is shown as a single signal, but may be set as a signal that includes a plurality of bits to control the operation of the semiconductor device 30. The command decoder 311 may be implemented to generate a write signal to perform a write operation, depending on embodiments.

The row address generation circuit 312 may receive first to "L"$^{th}$ external row addresses ERAD<1:L> in synchronization with the clock CLK. The row address generation circuit 312 may buffer the first to "L"$^{th}$ external row addresses ERAD<1:L> in synchronization with the clock CLK to generate first to "L"$^{th}$ row addresses RAD<1:L>. The number of bits "L" of the first to "L"$^{th}$ external row addresses ERAD<1:L> and the first to "L"$^{th}$ row addresses RAD<1:L> may be set to various numbers of bits depending on the embodiment, and the number of bits "L" may be set to a positive integer.

The column address generation circuit 313 may receive first to "M"$^{th}$ external column addresses ECAD<1:M> in synchronization with the clock CLK. The column address generation circuit 313 may buffer the first to "M"$^{th}$ external column addresses ECAD<1:M> in synchronization with the clock CLK to generate first to "M"$^{th}$ column addresses CAD<1:M>. The number of bits "M" of the first to "M"$^{th}$ external column addresses ECAD<1:M> and the first to "M"$^{th}$ column addresses CAD<1:M> may be set to various numbers of bits depending on the embodiment, and the number of bits "M" may be set to a positive integer.

The input circuit 310 may receive the command CMD, the first to "L"$^{th}$ external row addresses ERAD<1:L>, and the first to "M"$^{th}$ external column addresses ECAD<1:M> in synchronization with the clock CLK. The input circuit 310 may generate the read signal RD, the first to "L"$^{th}$ row addresses RAD<1:L>, and the first to "M"$^{th}$ column addresses CAD<1:M>, based on the command CMD, the first to "L"$^{th}$ external row addresses ERAD<1:L>, and the first to "M"$^{th}$ external column addresses ECAD<1:M>.

The memory circuit 320 may include a plurality of memory cells MCs. The memory circuit 320 may output the first to eighth internal data ID<1:8> and the first to third internal parities IP<1:3> stored in the memory cell MC selected by the first to "L"$^{th}$ row addresses RAD<1:L> and the first to "M"$^{th}$ column addresses CAD<1:M> when the read signal RD is enabled. The memory circuit 320 may be implemented to store the first to eighth internal data ID<1:8> and the first to third internal parities IP<1:3> in the memory cell MC selected by the first to "L"$^{th}$ row addresses RAD<1:L> and the first to "M"$^{th}$ column addresses CAD<1:M> during the write operation. The first to third internal parities IP<1:3> may be set as signals containing error information included in the first to eighth internal data ID<1:8>. The first to eighth internal data ID<1:8> and the first to third internal parities IP<1:3> may be stored and output in and from the same memory cell MC or different memory cells MCs.

The error correction circuit 330 may correct the error of the first to eighth internal data ID<1:8>, based on the first to eighth internal data ID<1:8> and the first to third internal parities IP<1:3> to generate the data DATA<1:8> during the read operation. The error correction circuit 330 may generate the correction enable signal CE when the error of the first to eighth internal data ID<1:8> is correctable during the read operation. Each of the first to eighth internal data ID<1:8> and the first to eighth data DATA<1:8> is set to have eight bits, but the number of bits of each of the first to eighth internal data ID<1:8> and the first to eighth data DATA<1:8> may be set in various ways depending on the embodiment. The first to third internal parities IP<1:3> are set to have 3 bits, but the number of bits of the first to third internal parities IP<1:3> may be set in various ways depending on the embodiment.

The fail detection circuit 340 may latch the first to "L"$^{th}$ row addresses RAD<1:L> and the first to "M"$^{th}$ column addresses CAD<1:M>. The fail detection circuit 340 may latch the plurality of first to "M"$^{th}$ column addresses CAD<1:M> having different combinations in one combination of the first to "L"$^{th}$ row addresses RAD<1:L> whenever the correction enable signal CE is enabled. The fail detection circuit 340 may latch the plurality of first to "L"$^{th}$ row addresses RAD<1:L> having different combinations in one combination of the first to "M"$^{th}$ column addresses CAD<1:M> whenever the correction enable signal CE is enabled. The fail detection circuit 340 may generate the first to "L"$^{th}$ pre-row addresses (P_RAD<1:L> in FIGS. 5 and 12) and the first to "M"$^{th}$ pre-column addresses (P_CAD<1:M> in FIGS. 7 and 11), based on the latched first to "L"$^{th}$ row addresses RAD<1:L> and first to "M"$^{th}$ column addresses CAD<1:M>. The fail detection circuit 340 may compare the first to "L"$^{th}$ row addresses RAD<1:L> and first to "M"$^{th}$ column addresses CAD<1:M> with the first to "L"$^{th}$ pre-row addresses (P_RAD<1:L> in FIGS. 5 and 12) and first to "M"$^{th}$ pre-column addresses (P_CAD<1:M> in FIGS. 7 and 11), respectively, to generate the flag signal FLAG when the correction enable signal CE is enabled. The fail detection circuit 340 may output the flag signal FLAG to the controller 20.

The semiconductor device 30 may correct the error of the first to eighth internal data ID<1:8> output from the memory cell MC selected by the first to "L"$^{th}$ external row addresses ERAD<1:L> and the first to "M"$^{th}$ external column addresses ECAD<1:M> to output error-corrected first to eighth internal data as the first to eighth data DATA<1:8>, based on the command CMD during the read operation. The semiconductor device 30 may output the flag signal FLAG that is enabled when correcting the error of the first to eighth internal data ID<1:8> output by the same first to "L"$^{th}$ external row addresses ERAD<1:L> and the same first to "M"$^{th}$ external column addresses ECAD<1:M> a set number of times to the controller 20.

Figure 3:
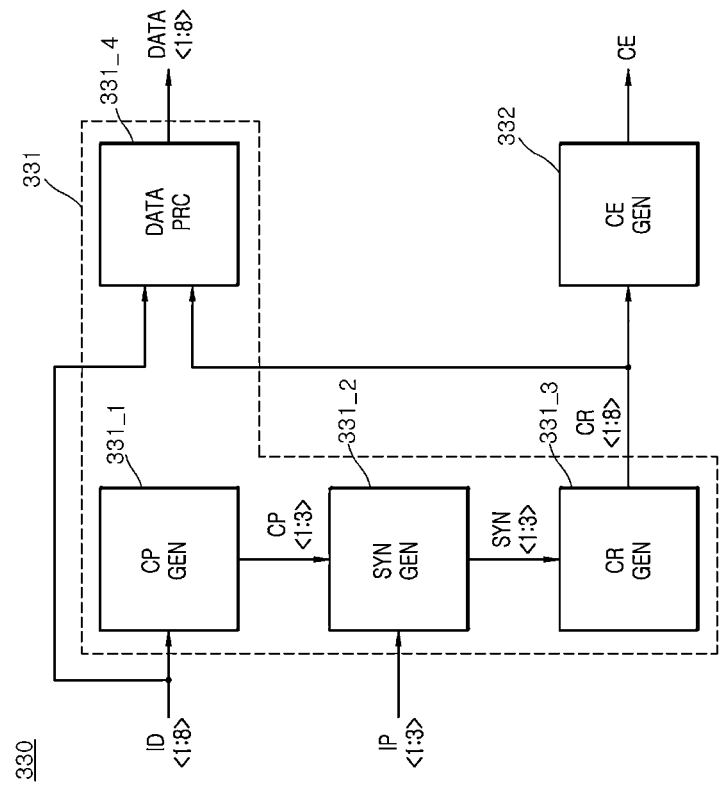
FIG. 3 is a block diagram illustrating a configuration according to an embodiment of an error correction circuit included in the semiconductor device shown in FIG. 2.

FIG. 3 is a block diagram illustrating a configuration according to an embodiment of the error correction circuit 330 included in the semiconductor device 30 shown in FIG. 2. The error correction circuit 330 may include an error processing circuit 331 and a correction enable signal generation circuit 332.

The error processing circuit 331 may include a calculation parity generation circuit 331_1, a syndrome generation circuit 331_2, an error correction signal generation circuit 331_3, and a data processing circuit 331_4.

The calculation parity generation circuit 331_1 may generate first to third calculation parities CP<1:3> including the error information of the first to eighth internal data ID<1:8>. The calculation parity generation circuit 331_1 may perform an ECC encoding operation, based on the first to eighth internal data ID<1:8> to generate the first to third calculation parities CP<1:3> during the read operation.

The ECC encoding operation may be set as an operation of comparing the bits of data using an error correction code (ECC) in a general error correction circuit and generating parity bits according to a comparison result.

The syndrome generation circuit 331_2 may compare the first to third calculation parities CP<1:3> with the first to third internal parities IP<1:3> to generate first to third syndromes SYN<1:3> during the read operation.

The error correction signal generation circuit 331_3 may perform an ECC decoding operation on the first to third syndromes SYN<1:3> to generate first to eighth error correction signals CR<1:8>.

The ECC decoding operation may be set as an operation of comparing the parity bits of the data generated in the ECC encoding operation using the error correction code (ECC) in the general error correction circuit with the parity bits generated at the previous time to generate the syndrome bits, and decoding the syndrome bits to correct the error included in the data.

The data processing circuit 331_4 may correct the error of the first to eighth internal data ID<1:8> input from the memory circuit 330, based on the first to eighth error correction signals CR<1:8> to output error-corrected data as the first to eighth data DATA<1:8>. The data processing circuit 331_4 may invert the bit in which an error occurs among the first to eighth internal data ID<1:8>, based on the first to eighth error correction signals CR<1:8> to output the first to eighth internal data ID<1:8> including the inverted bit as the first to eighth data DATA<1:8>. The data processing circuit 331_4 may output the error-corrected first to eighth data DATA<1:8> to the controller 20 during the read operation.

The error processing circuit 331 may perform the ECC encoding operation and the ECC decoding operation, based on the first to eighth internal data ID<1:8> and the first to third internal parities IP<1:3> to generate the first to eighth error correction signals CR<1:8>. The error processing circuit 331 may correct the errors of the first to eighth internal data ID<1:8>, based on the first to eighth error correction signals CR<1:8> to output the error-corrected first to eighth internal data as the first to eighth data DATA<1:8>.

The correction enable signal generation circuit 332 may generate the correction enable signal CE that is enabled based on the first to eighth error correction signals CR<1:8>. The correction enable signal generation circuit 332 may generate the correction enable signal CE that is enabled at a logic "high" level when one of the first to eighth error correction signals CR<1:8> is generated at a logic "high" level.

The error correction circuit 330 may detect the error of the first to eighth internal data ID<1:8> and correct the error of the first to eighth internal data ID<1:8> to output the error-corrected first to eighth internal data as the first to eighth data DATA<1:8>. The error correction circuit 330 may perform the ECC encoding operation and the ECC decoding operation on the first to eighth internal data ID<1:8> and correct the error of the first to eighth internal data ID<1:8> to output the error-corrected first to eighth internal data as the first to eighth data DATA<1:8>. The error correction circuit 330 may output the error-corrected first to eighth data DATA<1:8> to the controller 20 during the read operation. The error correction circuit 330 may generate the correction enable signal CE that is enabled at a logic "high" level when correcting the error of the first to eighth internal data ID<1:8>.

Figure 4:
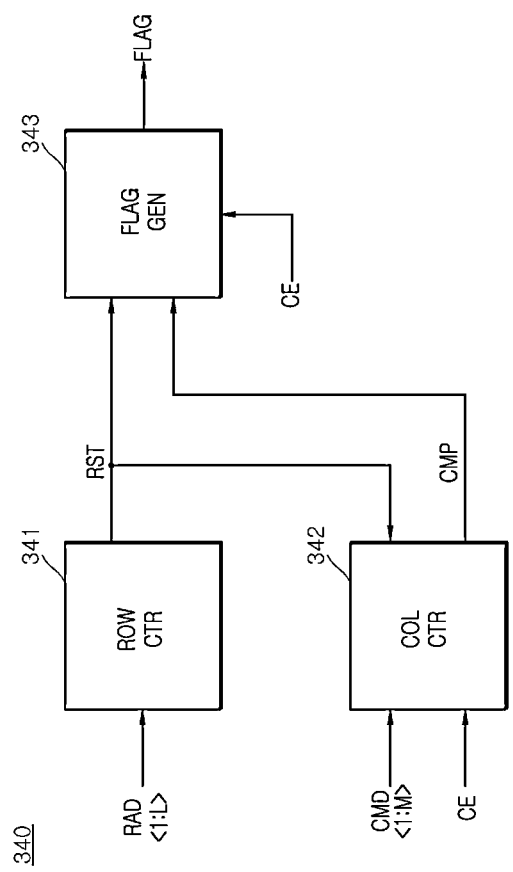
FIG. 4 is a block diagram illustrating a configuration according to an embodiment of a fail detection circuit included in the semiconductor device shown in FIG. 2.

FIG. 4 is a block diagram illustrating a configuration according to an embodiment of the fail detection circuit 340 included in the semiconductor device 30 shown in FIG. 2. The fail detection circuit 340 may include a row control circuit 341, a column control circuit 342, and a flag signal generation circuit 343.

Figure 5:
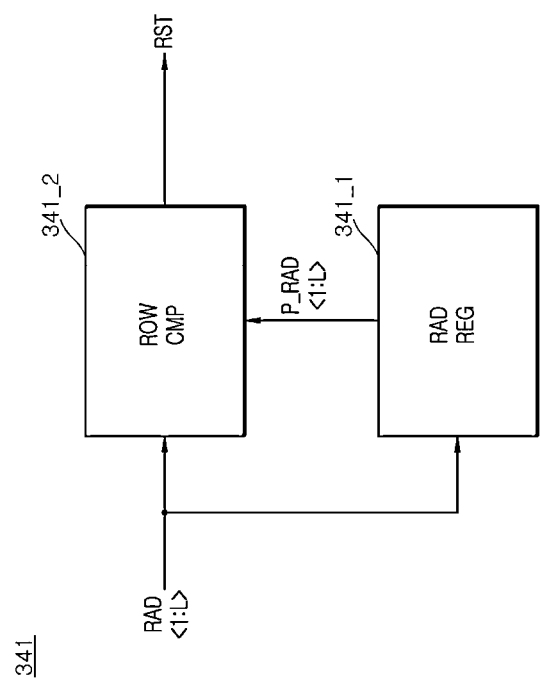
FIG. 5 is a block diagram illustrating a configuration according to an embodiment of a row control circuit included in the fail detection circuit shown in FIG. 4.

The row control circuit 341 may latch the first to "L"$^{th}$ row addresses RAD<1:L> to generate the first to "L"$^{th}$ pre-row addresses (P_RAD<1:L> in FIG. 5). The row control circuit 341 may compare the first to "L"th row addresses RAD<1:L> input after generating the first to "L"th pre-row addresses (P_RAD<1:L> in FIG. 5) with the first to "L"th pre-row addresses RAD<1:L> to generate a reset signal RST. The row control circuit 341 may generate the reset signal RST that is enabled when the first to "L"th row addresses RAD<1:L> and the first to "L"th pre-row addresses (P_RAD<1:L> in FIG. 5) have different combinations. The row control circuit 341 may generate the reset signal RST that is disabled when the first to "L"th row addresses RAD<1:L> and the first to "L"th pre-row addresses (P_RAD<1:L> in FIG. 5) have the same combination.

The column control circuit 342 may latch the first to "M"th column addresses CAD<1:M> to generate the first to "M"th pre-column addresses (P_CAD<1:L> in FIG. 7) when the correction enable signal CE is enabled. The column control circuit 342 may compare the first to "M"th column addresses CAD<1:M> input after generating the first to "M"th pre-column addresses (P_CAD<1:M> in FIG. 7) with the first to "M"th pre-column addresses (P_CAD<1:M> in FIG. 7) to generate the comparison signal CMP. The column control circuit 342 may generate the comparison signal CMP that is enabled when the first to "M"th column addresses CAD<1:M> and the first to "M"th pre-column addresses (P_CAD<1:M> in FIG. 7) have different combinations. The column control circuit 342 may generate the comparison signal CMP that is disabled when the first to "M"th column addresses CAD<1:M> and the first to "M"th pre-column addresses (P_CAD<1:M> in FIG. 7) have the same combination. The column control circuit 342 may initialize the first to "M"th pre-column addresses (P_CAD<1:M> in FIG. 7) when the reset signal RST is enabled.

The flag signal generation circuit 343 may count first and second counting signals (CNT<1:2> in FIG. 8) when the correction enable signal CE is enabled and the comparison signal CMP is enabled. The flag signal generation circuit 343 may generate the flag signal FLAG that is enabled when the first and second counting signals (CNT<1:2> in FIG. 8) are counted a set number of times. The flag signal generation circuit 343 may generate the flag signal FLAG that is disabled when the first and second counting signals (CNT<1:2> in FIG. 8) are counted less than the set number of times. The flag signal generation circuit 343 may initialize the first and second counting signals (CNT<1:2> in FIG. 8) when the reset signal RST is enabled.

FIG. 5 is a block diagram illustrating a configuration according to an embodiment of the row control circuit 341 included in the fail detection circuit 340 shown in FIG. 4. The row control circuit 341 may include a row register 341_1 and a row comparison circuit 341_2.

The row register 341_1 may latch the first to "L"th row addresses RAD<1:L> to generate the first to "L"th pre-row addresses. The row register 341_1 may latch the first to "L"th row addresses RAD<1:L> whenever the first to "L"th row addresses RAD<1:L> are input to generate the first to "L"th pre-row addresses P_RAD<1:L>. The row register 341_1 may include a plurality of registers. The row register 341_1 may latch the first to "L"th row addresses RAD<1:L> through the plurality of registers to generate the first to "L"th pre-row addresses P_RAD<1:L>.

The row comparison circuit 341_2 may compare the first to "L"th row addresses RAD<1:L> with the first to "L"th pre-row addresses P_RAD<1:L> to generate the reset signal RST. The row comparison circuit 341_2 may generate the reset signal RST that is enabled at a logic "high" level when the first to "L"th row addresses RAD<1:L> and the first to "L"th pre-row addresses P_RAD<1:L> have different combinations. The row comparison circuit 341_2 may generate the reset signal RST that is disabled at a logic "low" level when the first to "L"th row addresses RAD<1:L> and the first to "L"th pre-row addresses P_RAD<1:L> have the same combination.

Figure 6:
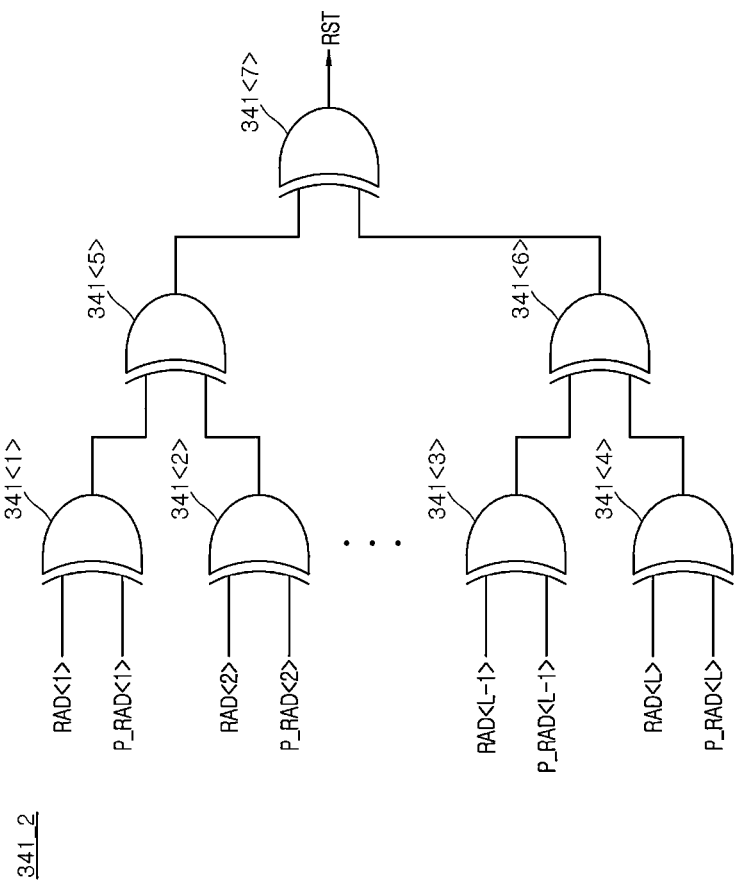
FIG. 6 is a circuit diagram illustrating a configuration according to an embodiment of a row comparison circuit included in the row control circuit shown in FIG. 5.

FIG. 6 is a circuit diagram illustrating a configuration according to an embodiment of the row comparison circuit 341_2 included in the row control circuit 341 shown in FIG. 5.

The row comparison circuit 341_2 may be implemented with a plurality of exclusive OR gates 341<1>~341<7>. The exclusive OR gate 341<1> may generate an output signal of a logic "high" level when the first row address RAD<1> and the first pre-row address P_RAD<1> are at different logic levels. The exclusive OR gate 341<1> may generate an output signal of a logic "low" level when the first row address RAD<1> and the first pre-row address P_RAD<1> are at the same logic level. The exclusive OR gates 341<2>~341<7> may perform the same operation as the exclusive OR gate 341<1>, so detailed description will be omitted.

The row comparison circuit 341_2 may generate the reset signal RST that is enabled at a logic "high" level when the first to "L"th row addresses RAD<1:L> and the first to "L"th pre-row addresses P_RAD<1:L> have different combinations. The row comparison circuit 341_2 may generate the reset signal RST that is disabled at a logic "low" level when the first to "L"th row addresses RAD<1:L> and the first to "L"th pre-row addresses P_RAD<1:L> have the same combination.

Figure 7:
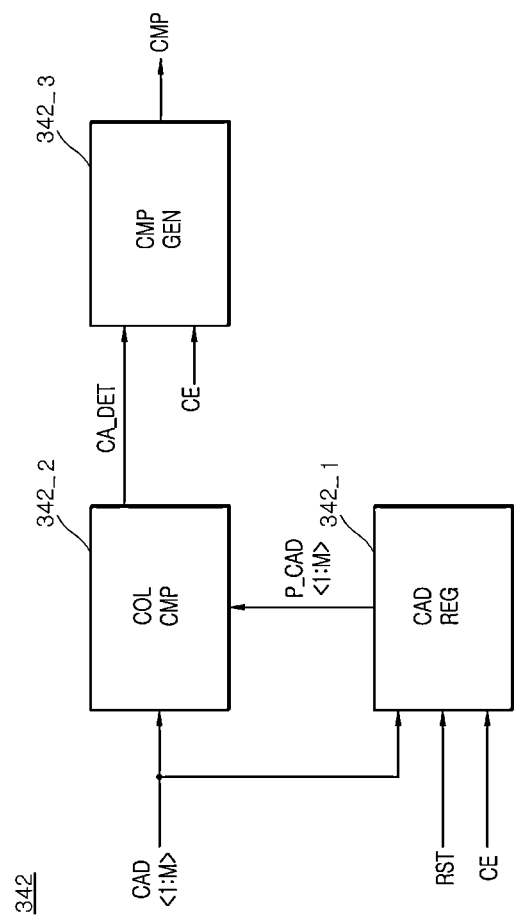
FIG. 7 is a block diagram illustrating a configuration according to an embodiment of a column control circuit included in the fail detection circuit shown in FIG. 4.

FIG. 7 is a block diagram illustrating a configuration according to an embodiment of the column control circuit 342 included in the fail detection circuit 340 shown in FIG. 4. The column control circuit 342 may include a column register 342_1, a column comparison circuit 342_2, and a comparison signal generation circuit 342_3.

The column register 342_1 may latch the first to "M"th column addresses CAD<1:M> to generate the first to "M"th pre-column addresses P_CAD<1:M> when the correction enable signal CE is enabled. The column register 342_1 may latch the first to "M"th column addresses CAD<1:M> whenever the correction enable signal CE is enabled to generate the first to "M"th pre-column addresses P_CAD<1:M>. The column register 342_1 may include a plurality of registers. The column register 342_1 may latch the first to "M"th column addresses CAD<1:M> through the plurality of registers to generate the first to "M"th pre-column addresses P_CAD<1:M>. The column register 342_1 may generate the first to "M"th pre-column addresses P_CAD<1:M> that are initialized when the reset signal RST is enabled. The column register 342_1 may generate the first to "M"th pre-column addresses P_CAD<1:M> that are all initialized at a logic "low" level when the reset signal RST is enabled at a logic "high" level.

The column comparison circuit 342_2 may compare the first to "M"th column addresses CAD<1:M> with the first to "M"th pre-column addresses P_CAD<1:M> to generate a column detection signal CA_DET. The column comparison circuit 342_2 may generate the column detection signal CA_DET that is enabled at a logic "high" level when the first to "M"th column addresses CAD<1:M> and the first to "M"th pre-column addresses P_CAD<1:M> have different combinations. The column comparison circuit 342_2 may generate the column detection signal CA_DET that is disabled at a logic "low" level when the first to "M"th column addresses CAD<1:M> and the first to "M"th pre-column addresses P_CAD<1:M> have the same combination. The column comparison circuit 342_2 may be different from the row comparison circuit 341_2 shown in FIG. 6 only in the input and output signals, and may be implemented with the same circuit and perform the same operation, so detailed description will be omitted.

The comparison signal generation circuit 342_3 may generate the comparison signal CMP, based on the correction enable signal CE and the column detection signal CA_DET. The comparison signal generation circuit 342_3 may generate the comparison signal CMP, based on the column detection signal CA_DET when the correction enable signal CE is enabled. The comparison signal generation circuit 342_3 may generate the comparison signal CMP that is enabled at a logic "high" level when the correction enable signal CE is enabled and the column detection signal CA_DET is enabled. The comparison signal generation circuit 342_3 may generate the comparison signal CMP that is disabled at a logic "low" level when the correction enable signal CE is enabled and the column detection signal CA_DET is disabled.

Figure 8:
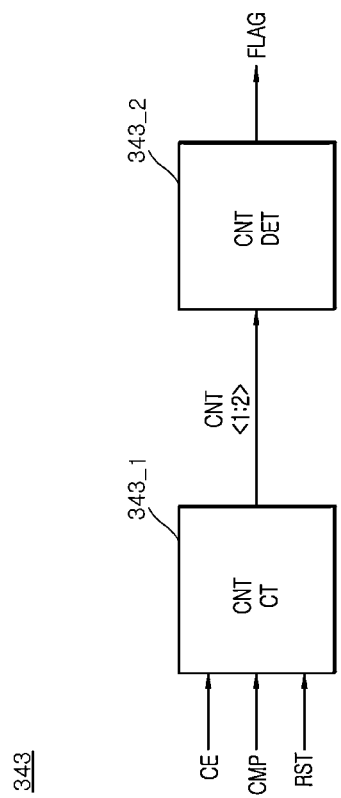
FIG. 8 is a block diagram illustrating a configuration according to an embodiment of a flag signal generation circuit included in the fail detection circuit shown in FIG. 4.

FIG. 8 is a block diagram illustrating a configuration according to an embodiment of the flag signal generation circuit 343 included in the fail detection circuit 340 shown in FIG. 4. The flag signal generation circuit 343 may include a counting circuit 343_1 and a counting signal detection circuit 343_2.

The counting circuit 343_1 may generate first and second counting signals CNT<1:2> that are sequentially counted when the correction enable signal CE is enabled and the comparison signal CMP is enabled. The counting circuit 343_1 may generate the first and second counting signals CNT<1:2> that are sequentially up-counted whenever the correction enable signal CE is enabled at a logic "high" level and the comparison signal CMP is enabled at a logic "high" level. The counting circuit 343_1 may generate the first and second counting signals CNT<1:2> that are initialized when the reset signal RST is enabled. The counting circuit 343_1 may generate the first and second counting signals CNT<1:2> that are both initialized at a logic "low" level when the reset signal RST is enabled at a logic "high" level.

The counting signal detection circuit 343_2 may detect the logic levels of the first and second counting signals CNT<1:2> to generate the flag signal FLAG. The counting signal detection circuit 343_2 may generate the flag signal FLAG that is enabled at a logic "high" level when the first and second counting signals CNT<1:2> are counted a set number of times. The set number of times according to an embodiment of the present disclosure may mean that the first and second counting signals CNT<1:2> are up-counted three times.

FIG. 9 is a table illustrating an operation of the flag signal generation circuit 340 shown in FIG. 8.

The counting circuit 343_1 may generate the first counting signal CNT<1> of a logic "high" level and the second counting signal CNT<2> of a logic "low" level when the correction enable signal CE is enabled at a logic "high" level and the first comparison signal 1st CMP is enabled at a logic "high" level. The counting circuit 343_1 may generate the first counting signal CNT<1> of a logic "low" level and the second counting signal CNT<2> of a logic "high" level when the correction enable signal CE is enabled at a logic "high" level and the second comparison signal 2nd CMP is enabled at a logic "high" level. The counting circuit 343_1 may generate the first counting signal CNT<1> of a logic "high" level and the second counting signal CNT<2> of a logic "high" level when the correction enable signal CE is enabled at a logic "high" level and the third comparison signal 3rd CMP is enabled at a logic "high" level.

The counting circuit 343_1 may generate the first and second counting signals CNT<1:2> that are initialized when the reset signal RST is enabled at a logic "high" level. The counting circuit 343_1 may generate the first counting signal CNT<1> of a logic "low" level and the second counting signal CNT<2> of a logic "low" when the reset signal RST is enabled at a logic "high" level.

The set number of times according to an embodiment of the present disclosure may mean that the first and second counting signals CNT<1:2> are up-counted three times and the first counting signal CNT<1> of a logic "high" level and the second counting signal CNT<2> of a logic "high" level are generated.

The counting signal detection circuit 343_2 may generate the flag signal FLAG that is enabled at a logic "high" level when the first and second counting signals CNT<1:2> are counted a set number of times and the first counting signal CNT<1> of a logic "high" level and the second counting signal CNT<2> of a logic "high" level are generated.

Figure 10:
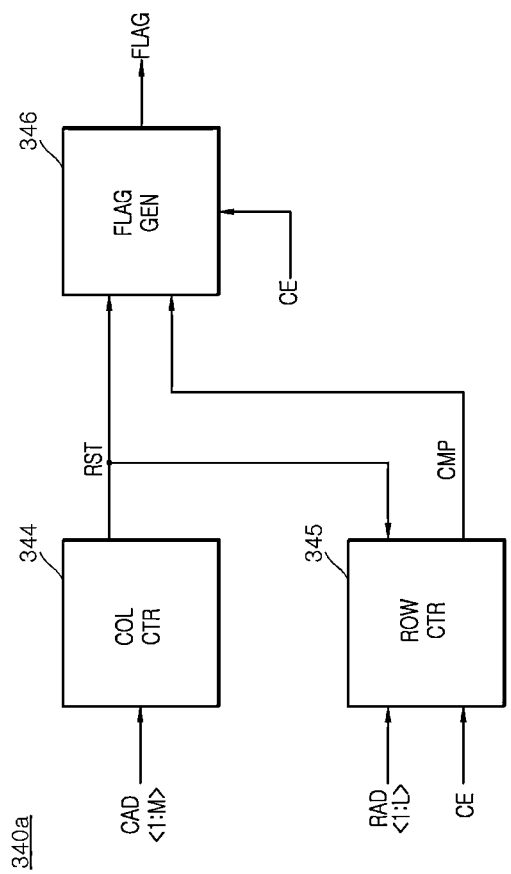
FIG. 10 is a block diagram illustrating a configuration according to another embodiment of the fail detection circuit included in the semiconductor device shown in FIG. 2.

FIG. 10 is a block diagram illustrating a configuration of a fail detection circuit 340a according to another embodiment of the fail detection circuit 340 included in the semiconductor device 30 shown in FIG. 2. The fail detection circuit 340a may include a column control circuit 344, a row control circuit 345, and a flag signal generation circuit 346.

Figure 11:
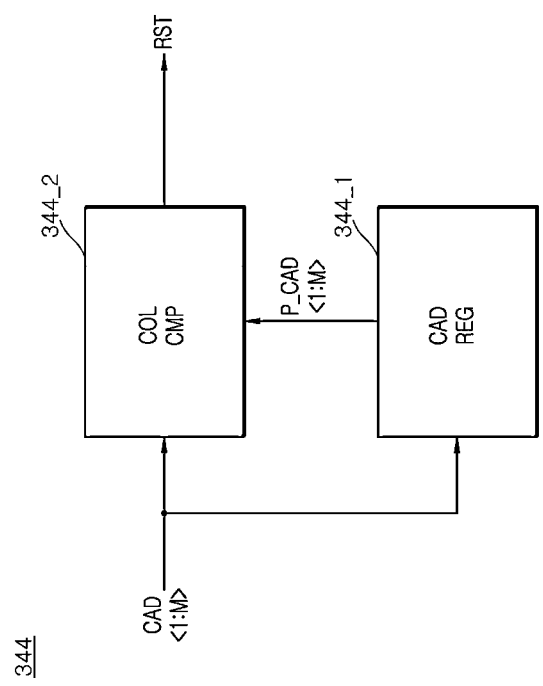
FIG. 11 is a block diagram illustrating a configuration according to an embodiment of a column control circuit included in the fail detection circuit shown in FIG. 10.

The column control circuit 344 may latch the first to "M"$^{th}$ column addresses CAD<1:M> to generate the first to "M"$^{th}$ pre-column addresses (P_CAD<1:M> in FIG. 11). The column control circuit 344 may compare the first to "M"$^{th}$ column addresses CAD<1:M> that are input after generating the first to "M"$^{th}$ pre-column addresses (P_CAD<1:M> in FIG. 11) with the first to "M"$^{th}$ pre-column addresses (P_CAD<1:M> in FIG. 11) to generate the reset signal RST. The column control circuit 344 may generate the reset signal RST that is enabled when the first to "M"$^{th}$ column addresses CAD<1:M> and the first to "M"$^{th}$ pre-column addresses (P_CAD<1:M> in FIG. 11) have different combinations. The column control circuit 344 may generate the reset signal RST that is disabled when the first to "M"$^{th}$ column addresses CAD<1:M> and the first to "M"$^{th}$ pre-column addresses (P_CAD<1:M> in FIG. 11) have the same combination.

The row control circuit 345 may latch the first to "L"$^{th}$ row addresses RAD<1:L> to generate the first to "L"$^{th}$ pre-row addresses (P_RAD<1:L> in FIG. 12) when the correction enable signal CE is enabled. The row control circuit 345 may compare the first to "L"$^{th}$ row addresses RAD<1:L> input after generating the first to "L"$^{th}$ pre-row addresses (P_RAD<1:L> in FIG. 12) with the first to "L"$^{th}$ pre-row addresses (P_RAD<1:L> in FIG. 12) to generate the comparison signal CMP. The row control circuit 345 may generate the comparison signal CMP that is enabled when the first to "L"$^{th}$ row addresses RAD<1:L> and the first to "L"$^{th}$ pre-row addresses (P_RAD<1:L> in FIG. 12) have different combinations. The row control circuit 345 may generate the comparison signal CMP that is disabled when the first to "L"$^{th}$ row addresses RAD<1:L> and the first to "L"$^{th}$ pre-row addresses (P_RAD<1:L> in FIG. 12) have the same combination. The row control circuit 345 may initialize the first to "L"$^{th}$ pre-row addresses (P_RAD<1:L> in FIG. 12) when the reset signal RST is enabled.

The flag signal generation circuit 346 may count the first and second counting signals (CNT<1:2> in FIG. 8) when the correction enable signal CE is enabled and the comparison signal CMP is enabled. The flag signal generation circuit 346 may generate the flag signal FLAG that is enabled when the first and second counting signals (CNT<1:2> in FIG. 8) are counted a set number of times. The flag signal generation circuit 346 may generate the flag signal FLAG that is disabled when the first and second counting signals (CNT<1:2> in FIG. 8) are counted less than the set number of times. The flag signal generation circuit 346 may initialize the first and second counting signals (CNT<1:2> in FIG. 8) when the reset signal RST is enabled. The flag signal generation circuit 346 may be implemented with the same circuit as the flag signal generation circuit 343 shown in FIG. 8 and perform the same operation, so detailed description will be omitted.

FIG. 11 is a block diagram illustrating a configuration according to an embodiment of the column control circuit 344 included in the fail detection circuit 340a shown in FIG. 10. The column control circuit 344 may include a column register 344_1 and a column comparison circuit 344_2.

The column register 344_1 may latch the first to "M"$^{th}$ column addresses CAD<1:M> to generate the first to "M"$^{th}$ pre-column addresses P_CAD<1:M>. The column register 344_1 may latch the first to "M"$^{th}$ column addresses CAD<1:M> whenever the first to "M"$^{th}$ column addresses CAD<1:M> are input to generate the first to "M"$^{th}$ pre-column addresses P_CAD<1:M>. The column register 344_1 may include a plurality of registers. The column register 344_1 may latch the first to "M"$^{th}$ column addresses CAD<1:M> through the plurality of registers to generate the first to "M"$^{th}$ pre-column addresses P_CAD<1:M>.

The column comparison circuit 344_2 may compare the first to "M"$^{th}$ column addresses CAD<1:M> with the first to "M"$^{th}$ pre-column addresses P_CAD<1:M> to generate the reset signal RST. The column comparison circuit 344_2 may generate the reset signal RST that is enabled at a logic "high" level when the first to "M"$^{th}$ column addresses CAD<1:M> and the first to "M"$^{th}$ pre-column addresses P_CAD<1:M> have different combinations. The column comparison circuit 344_2 may generate the reset signal RST that is disabled at a logic "low" level when the first to "M"$^{th}$ column addresses CAD<1:M> and the first to "M"$^{th}$ pre-column addresses P_CAD<1:M> have the same combination.

Figure 12:
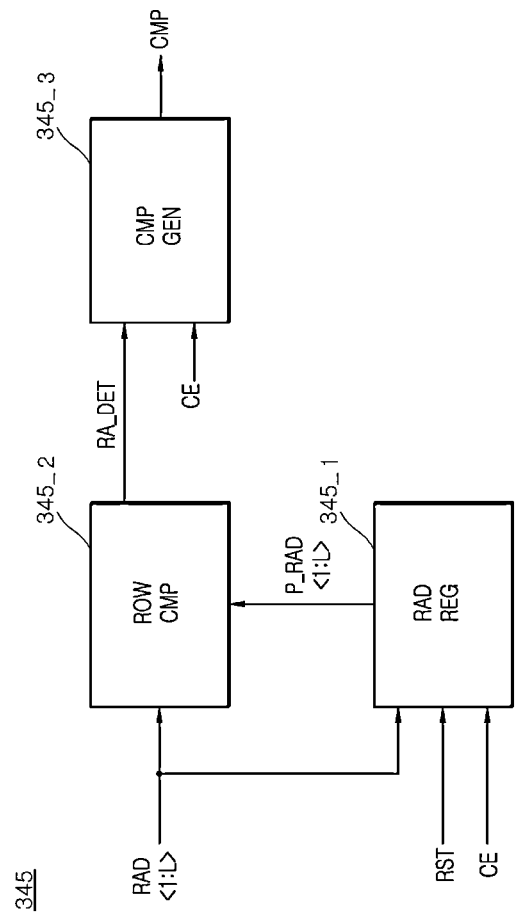
FIG. 12 is a block diagram illustrating a configuration according to an embodiment of a row control circuit included in the fail detection circuit shown in FIG. 10.

FIG. 12 is a block diagram illustrating a configuration according to an embodiment of the row control circuit 345 included in the fail detection circuit 340a shown in FIG. 10. The row control circuit 345 may include a row register 345_1, a row comparison circuit 345_2, and a comparison signal generation circuit 345_3.

The row register 345_1 may latch the first to "L"$^{th}$ row addresses RAD<1:L> when the correction enable signal CE is enabled to generate the first to "L"$^{th}$ pre-row addresses P_RAD<1:L>. The row register 345_1 may latch the first to "L"$^{th}$ row addresses RAD<1:L> whenever the correction enable signal CE is enabled to generate the first to "L"$^{th}$ pre-row addresses P_RAD<1:L>. The row register 345_1 may include a plurality of registers. The row register 345_1 may latch the first to "L"$^{th}$ row addresses RAD<1:L> through the plurality of registers to generate the first to "L"$^{th}$ pre-row addresses P_RAD<1:L>. The row register 345_1 may generate the first to "L"$^{th}$ pre-row addresses P_RAD<1:L> that are initialized when the reset signal RST is enabled. The row register 345_1 may generate the first to "L"$^{th}$ pre-row addresses P_RAD<1:L> that are all initialized at a logic "low" level when the reset signal RST is enabled at a logic "high" level.

The row comparison circuit 345_2 may compare the first to "L"$^{th}$ row addresses RAD<1:L> with the first to "L"$^{th}$ pre-row addresses P_RAD<1:L> to generate a row detection signal RA_DET. The row comparison circuit 345_2 may generate the row detection signal RA_DET that is enabled at a logic "high" level when the first to "L"$^{th}$ row addresses RAD<1:L> and the first to "L"$^{th}$ pre-row addresses P_RAD<1:L> have different combinations. The row comparison circuit 345_2 may generate the row detection signal RA_DET that is disabled at a logic "low" level when the first to "L"$^{th}$ row addresses RAD<1:L> and the first to "L"$^{th}$ pre-row addresses P_RAD<1:L> have the same combination.

The comparison signal generation circuit 345_3 may generate the comparison signal CMP, based on the correction enable signal CE and the row detection signal RA_DET. The comparison signal generation circuit 345_3 may generate the comparison signal CMP, based on the row detection signal RA_DET when the correction enable signal CE is enabled. The comparison signal generation circuit 345_3 may generate the comparison signal CMP that is enabled at a logic "high" level when the correction enable signal CE is enabled and the row detection signal RA_DET is enabled. The comparison signal generation circuit 345_3 may generate the comparison signal CMP that is disabled at a logic "low" level when the correction enable signal CE is enabled and the row detection signal RA_DET is disabled.

Figure 13:
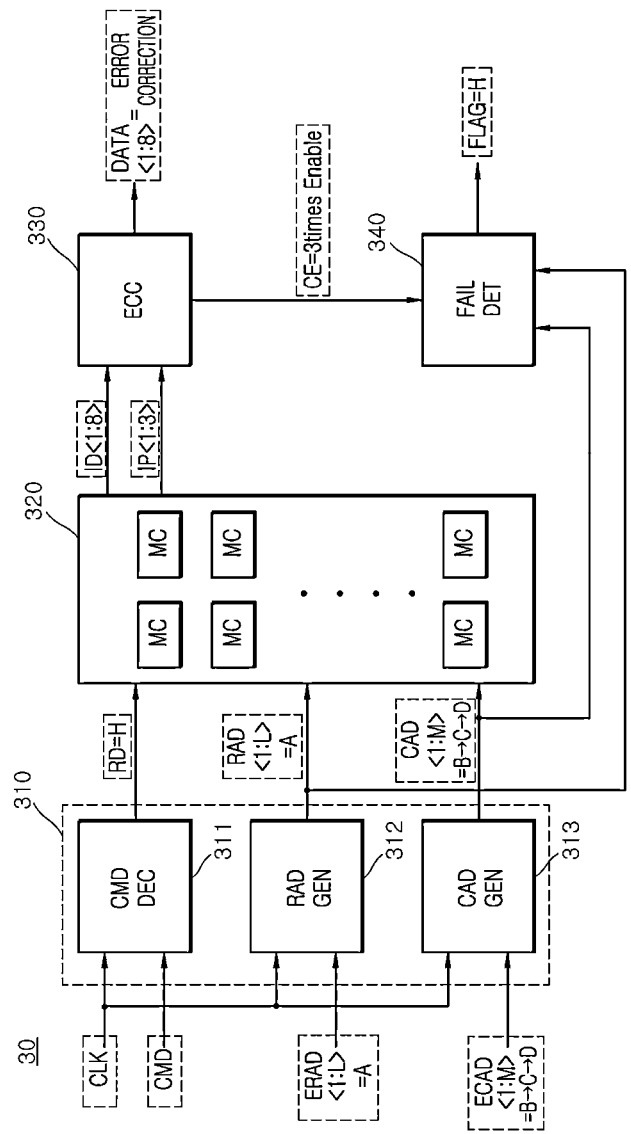
FIG. 13 is a diagram illustrating an error correction operation of a semiconductor device according to an embodiment of the present disclosure.

FIG. 13 is a diagram illustrating an error correction operation of a semiconductor device 30 according to an embodiment of the present disclosure. Referring to FIG. 13, the error correction operation will be described by taking an example of the operation when the error correction operation is performed three times, which is the set number of times during the read operation, as follows.

A command decoder 311 of an input circuit 310 may decode a command CMD in synchronization with a clock CLK to generate a read signal RD that is enabled at a logic "high" level to perform the read operation. A row address generation circuit 312 of the input circuit 310 may buffer the first to "L"$^{th}$ external row addresses ERAD<1:L> of an "A" combination in synchronization with the clock CLK to generate first to "L"$^{th}$ row addresses RAD<1:L> of the "A" combination. A column address generation circuit 313 of the input circuit 310 may buffer first to "M"$^{th}$ external column addresses ECAD<1:M> of a "B" combination in synchronization with the clock CLK to generate first to "M"$^{th}$ column addresses CAD<1:M> of the "B" combination.

A memory circuit 320 may output first to eighth internal data ID<1:8> and first to third internal parities IP<1:3> that are stored in a memory cell MC selected by the first to "L"$^{th}$ row addresses RAD<1:L> and the first to "M"$^{th}$ column addresses CAD<1:M> when the read signal RD is enabled at a logic "high" level.

An error correction circuit 330 may correct an error of the first to eighth internal data ID<1:8> to generate first to eighth data DATA<1:8>, based on the first to eighth internal data ID<1:8> and the first to third internal parities IP<1:3> during the read operation. The error correction circuit 330 may output the error-corrected first to eighth data DATA<1:8> to the controller 20. The error correction circuit 330 may generate a correction enable signal CE that is enabled at a logic "high" level when the error in the first to eighth internal data ID<1:8> is correctable during the read operation.

A fail detection circuit 340 may latch the first to "L"$^{th}$ row addresses RAD<1:L> of a "A" combination and the first to "M"$^{th}$ column addresses CAD<1:M> of a "B" combination when the correction enable signal CE is enabled at a logic "high" level. The fail detection circuit 340 may generate a flag signal FLAG of a logic "low" level because the correction enable signal CE is enabled once (a first time). The fail detection circuit 340 may output the flag signal FLAG to the controller 20.

The command decoder 311 of the input circuit 310 may decode the command CMD in synchronization with the clock CLK to generate the read signal RD that is enabled at a logic "high" level to perform a read operation. The row address generation circuit 312 of the input circuit 310 may buffer the first to "L"$^{th}$ external row addresses ERAD<1:L> of the "A" combination in synchronization with the clock CLK to generate the first to "L"$^{th}$ row addresses RAD<1:L> of the "A" combination. The column address generation circuit 313 of the input circuit 310 may buffer the first to "M"$^{th}$ external column addresses ECAD<1:M> of a "C" combination in synchronization with the clock CLK to generate the first to "M"$^{th}$ column addresses CAD<1:M> of the "C" combination. The first to "M"$^{th}$ column addresses CAD<1:M> of the "C" combination may mean a combination different from the first to "M"$^{th}$ column addresses CAD<1:M> of the "B" combination.

The memory circuit 320 may output the first to eighth internal data ID<1:8> and the first to third internal parities IP<1:3> stored in the memory cell MC selected by the first to "L"$^{th}$ row addresses RAD<1:L> and the first to "M"$^{th}$ column addresses CAD<1:M> when the read signal RD is enabled at a logic "high" level.

The error correction circuit 330 may correct the error of the first to eighth internal data ID<1:8> to generate the first to eighth data DATA<1:8>, based on the first to eighth internal data ID<1:8> and the first to third internal parities IP<1:3> during a read operation. The error correction circuit 330 may output the error-corrected first to eighth data DATA<1:8> to the controller 20. The error correction circuit 330 may generate the correction enable signal CE that is enabled at a logic "high" level when the error in the first to eighth internal data ID<1:8> is correctable during the read operation.

The fail detection circuit 340 may latch the first to "L"$^{th}$ row addresses RAD<1:L> of the "A" combination and the first to "M"$^{th}$ column addresses CAD<1:M> of the "C" combination when the correction enable signal CE is enabled at a logic "high" level. The fail detection circuit 340 may compare the first to "L"$^{th}$ row addresses RAD<1:L> of the "A" combination and the first to "M"$^{th}$ column addresses CAD<1:M> of the "C" combination with the first to "L"$^{th}$ pre-row addresses (P_RAD<1:L> in FIGS. 5 and 12) and the first to "M"$^{th}$ pre-column addresses (P_CAD<1:M> in FIGS. 7 and 11) to generate the flag signal FLAG of a logic "low" level when the correction enable signal CE is enabled at a logic "high" level a second time. The fail detection circuit 340 may output the flag signal FLAG to the controller 20.

The command decoder 311 of the input circuit 310 may decode the command CMD in synchronization with the clock CLK to generate the read signal RD that is enabled at a logic "high" level to perform the read operation. The row address generation circuit 312 of the input circuit 310 may buffer the first to "L"$^{th}$ external row addresses ERAD<1:L> of the "A" combination in synchronization with the clock CLK to generate the first to "L"$^{th}$ row addresses RAD<1:L> of the "A" combination. The column address generation circuit 313 of the input circuit 310 may buffer the first to "M"$^{th}$ external column addresses ECAD<1:M> of a "D" combination in synchronization with the clock CLK to generate the first to "M"$^{th}$ column addresses CAD<1:M> of the "D" combination. The first to "M"$^{th}$ column addresses CAD<1:M> of the "D" combination may mean a combination different from the first to "M"$^{th}$ column addresses CAD<1:M> of the "B" combination and the first to "M"$^{th}$ column addresses CAD<1:M> of the "C" combination.

The memory circuit 320 may output the first to eighth internal data ID<1:8> and the first to third internal parities IP<1:3> stored in the memory cell MC selected by the first to "L"$^{th}$ row addresses RAD<1:L> and the first to "M"$^{th}$ column addresses CAD<1:M> when the read signal RD is enabled at a logic "high" level.

The error correction circuit 330 may correct the error of the first to eighth internal data ID<1:8>, based on the first to eighth internal data ID<1:8> and the first to third internal parities IP<1:3> to generate the first to eighth data DATA<1:8>. The error correction circuit 330 may output the error-corrected first to eighth data DATA<1:8> to the controller 20. The error correction circuit 330 may generate the correction enable signal CE that is enabled at a logic "high" level when the error of the first to eighth internal data ID<1:8> is correctable during the read operation. The correction enable signal CE may be enabled a set number of times (3 times Enable).

The fail detection circuit 340 may latch the first to "L"$^{th}$ row addresses RAD<1:L> of the "A" combination and the first to "M"$^{th}$ column addresses CAD<1:M> of the "D" combination when the correction enable signal CE is enabled at a logic "high" level. The fail detection circuit 340 may compare the first to "L"$^{th}$ row addresses RAD<1:L> of the "A" combination and the first to "M"$^{th}$ column addresses CAD<1:M> of the "D" combination with the first to "L"$^{th}$ pre-row addresses (P_RAD<1:L> in FIGS. 5 and 12) of the "A" combination and the first to "M"$^{th}$ pre-column addresses (P_CAD<1:M> in FIGS. 7 and 11) of the "C" combination and generate the flag signal FLAG at a logic "high" level, as shown in FIG. 13, because the correction enable signal CE is enabled the set number of times (enabled 3 times). The fail detection circuit 340 may output the flag signal FLAG to the controller 20.

The controller 20 may output the flag signal FLAG of a logic "high" level to the host 10.

The host 10 may receive the flag signal FLAG of a logic "high" level and detect that the error correction operation is performed the set number of times. That is, the host 10 may monitor error occurrence in real time.

The electronic system 1 according to an embodiment of the present disclosure may provide the host with a flag signal that is enabled when an error correction operation of internal data output for each of the same row address and the same column address is performed a set number of times. The electronic system 1 may monitor the error occurrence in real time by providing the host with the flag signal generated when the error correction operation for the internal data output for each of the same row address and same column address input in real time is performed the set number of times. The electronic system 1 may monitor the error occurrence by providing the host with the flag signal that occurs when the number of error correction operations for the error occurring in internal data output by the same column address among multiple column addresses for one row address exceeds the set number. The electronic system 1 may monitor the error occurrence by providing the host with the flag signal that occurs when the number of error correction operations for the error occurring in the internal data output by the same row address among multiple row addresses for one column address exceeds the set number.

Figure 14:
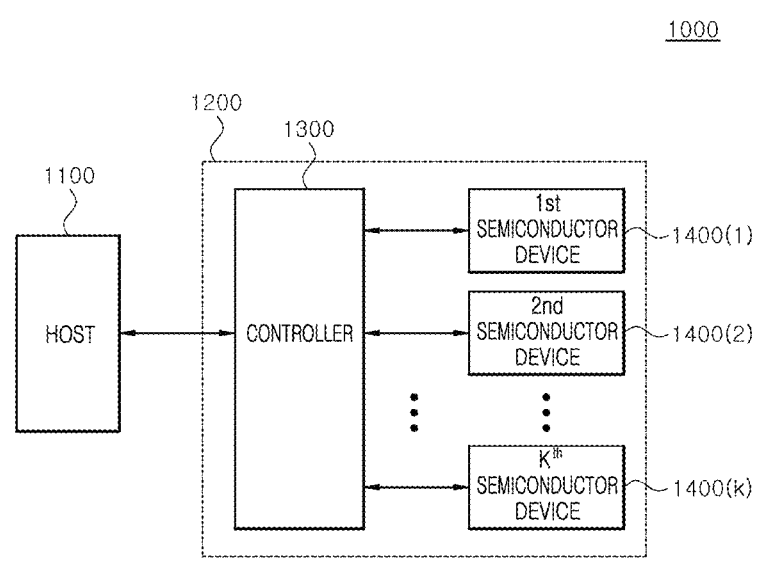
FIG. 14 is a block diagram illustrating a configuration according to an embodiment of another electronic system to which the electronic systems shown in FIGS. 1 to 13 are applied.

FIG. 14 is a block diagram illustrating a configuration according to an embodiment of an electronic system 1000 according to an embodiment of the present disclosure. As shown in FIG. 14, the electronic system 1000 may include a host 1100 and a semiconductor system 1200.

The host 1100 and the semiconductor system 1200 may transmit signals to each other using interface protocols. The interface protocols used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), serial attached SCSI (SAS), universal serial bus (USB), and the like.

The semiconductor system 1200 may include a controller 1300 and semiconductor devices 1400(1:K). The controller 1300 may control the semiconductor devices 1400(1:K) to perform a read operation and a write operation. Each of the semiconductor devices 1400(1:K) may generate a flag signal FLAG that is enabled when the error correction operation for the internal data output for each of the same first to "L"$^{th}$ row addresses RAD<1:L> and the same first to "M"$^{th}$ column addresses CAD<1:M> is performed a set number of times. Each of the semiconductor devices 1400(1:K) may generate the flag signal FLAG that is enabled when the error correction operation for the internal data output for each of the same first to "L"$^{th}$ row addresses RAD<1:L> and the same first to "M"$^{th}$ column addresses CAD<1:M> input in real time is performed the set number of times. Each of the semiconductor devices 1400(1:K) may generate the flag signal FLAG that is enabled when the error correction operation for the error occurring in the internal data output by the same first to "M"$^{th}$ column addresses CAD<1:M> among a plurality of first to "M"$^{th}$ column addresses CAD<1:M> for one of the first to "L"$^{th}$ row addresses RAD<1:L> is performed the set number of times. Each of the semiconductor devices 1400(1:K) may generate the flag signal FLAG that is enabled when the error correction operation for the error occurring in the internal data output by the same first to "L"$^{th}$ row addresses RAD<1:L> among the plurality of first to "L"$^{th}$ row addresses RAD<1:L> for one of the first to "M"$^{th}$ column addresses CAD<1:M> is performed the set number of times. Each of the semiconductor devices 1400(1:K) may output the flag signal FLAG to the controller 1300. The controller 1300 may output the flag signal FLAG to the host 1100. The host 1100 may receive the flag signal FLAG to detect that an error correction operation for each of the same first to "L"$^{th}$ row addresses RAD<1:L> and the same first to "M"$^{th}$ column addresses CAD<1:M> is performed a set number of times. The host 1100 may monitor error occurrence in real time.

The host 1100 may be implemented with the host 10 shown in FIG. 1. The controller 1300 may be implemented with the controller 20 shown in FIG. 1. Each of the semiconductor devices 1400(1:K) may be implemented with the semiconductor device 30 shown in FIG. 1. Each of the semiconductor devices 1400(1:K) may be implemented with one of a dynamic random-access memory (DRAM), a phase change random-access memory (PRAM), a resistive random-access memory (RRAM), a magnetic random-access memory (MRAM), and ferroelectric random-access memory (FRAM).

Concepts have been disclosed in conjunction with some embodiments as described above. Those skilled in the art will appreciate that various modifications, additions, and/or substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of the distinctive features in the equivalent scope should be construed as being included in the concepts.

What is claimed is:

1. An electronic system comprising:
    a controller configured to output a command, external row addresses, and external column addresses, receive a flag signal, and output the flag signal to a host; and
    a semiconductor device configured to correct an error of internal data output from a memory cell selected based on the command, the external row addresses having different combinations, and the external column addresses having different combinations to output error-corrected internal data as data, and output the flag signal that is enabled when correcting the error in the internal data a set number of times,
    wherein the semiconductor device is configured to enable the flag signal when the error in the internal data output by the external column addresses having different combinations in one combination of the external row addresses is corrected the set number of times.

2. The electronic system of claim 1, wherein the semiconductor device is configured to enable the flag signal when the error in the internal data output by the external row addresses having different combinations in one combination of the external column addresses is corrected the set number of times.

3. The electronic system of claim 1, wherein the semiconductor device comprises:
    an input circuit configured to receive the command, the external row addresses, and the external column addresses in synchronization with a clock and generate a read signal, row addresses, and column addresses, based on the command, the external row addresses, and the external column addresses;
    a memory circuit configured to output the internal data and internal parity in the memory cell selected based on the read signal, the row addresses, and the column addresses;
    an error correction circuit configured to correct the error of the internal data, based on the internal data and the internal parity to generate the data, and generate a correction enable signal when the error of the internal data is correctable; and
    a fail detection circuit configured to latch the row addresses and the column addresses to generate pre-row addresses and pre-column addresses, and compare the row addresses and the column addresses with the pre-row addresses and the pre-column addresses, respectively, to generate the flag signal.

4. The electronic system of claim 3, wherein the error correction circuit comprises:
    an error processing circuit configured to generate an error correction signal, based on the internal data and the internal parity and correct the error of the internal data, based on the error correction signal to output error-corrected internal data as the data; and
    a correction enable signal generation circuit configured to generate the correction enable signal, based on the error correction signal.

5. The electronic system of claim 4, wherein the error processing circuit comprises:
    a calculation parity generation circuit configured to compare bits included in the internal data to generate a calculation parity;

a syndrome generation circuit configured to compare the calculation parity with the internal parity to generate syndrome;

an error correction signal generation circuit configured to decode the syndrome to generate the error correction signal; and a data processing circuit configured to invert a bit of the internal data, in which an error occurs, based on the error correction signal data to generate the data.

6. The electronic system of claim 3, wherein the fail detection circuit comprises:

a row control circuit configured to latch the row addresses to generate the pre-row addresses, and generate a reset signal that is enabled when the row addresses input after generating the pre-row addresses have a first set of combinations and pre-row addresses have a second set of combinations different from the first set of combinations;

a column control circuit configured to latch the column addresses when the correction enable signal is enabled to generate the pre-column addresses, and generate a comparison signal that is enabled when the column addresses input after generating the pre-column addresses have a third set of combinations and pre-column addresses have a fourth set of combinations different from the third set of combinations; and a flag signal generation circuit configured to count a counting signal when the correction enable signal is enabled and the comparison signal is enabled, and generate the flag signal that is enabled when the counting signal is counted a set number of times.

7. The electronic system of claim 6, wherein the column control circuit is configured to initialize the pre-column addresses when the reset signal is enabled, and wherein the flag signal generation circuit is configured to initialize the counting signal when the reset signal is enabled.

8. The electronic system of claim 6, wherein the row control circuit comprises:

a row register configured to latch the row addresses to generate the pre-row addresses; and a row comparison circuit configured to generate the reset signal that is enabled when the row addresses and the pre-row addresses have different combinations.

9. The electronic system of claim 6, wherein the column control circuit comprises:

a column register configured to latch the column addresses to generate the pre-column addresses when the correction enable signal is enabled, and initialize the pre-column addresses when the reset signal is enabled;

a column comparison circuit configured to generate a column detection signal that is enabled when the column addresses and the pre-column addresses have different combinations; and a comparison signal generation circuit configured to generate the comparison signal, based on the column detection signal when the correction enable signal is enabled.

10. The electronic system of claim 6, wherein the flag signal generation circuit comprises:

a counting circuit configured to generate the counting signals that sequentially counted when the correction enable signal is enabled and the comparison signal is enabled, and initialize the counting signals when the reset signal is enabled; and a counting signal detection circuit configured to generate the flag signal when the counting signals are counted the set number of times.

11. A semiconductor device comprising:

an error correction circuit configured to correct an error of internal data, based on the internal data output from a memory cell selected based on row addresses and column addresses having different combinations and an internal parity to generate data, and generate a correction enable signal when the error of the internal data is correctable; and a fail detection circuit configured to latch the column addresses having different combinations in one combination of the row addresses whenever the correction enable signal is enabled, and generate a flag signal that is enabled when the column addresses having different combinations are latched a set number of times, wherein the fail detection circuit is configured to enable the flag signal when the error in the internal data output by the column addresses having different combinations in one combination of the row addresses is corrected the set number of times.

12. The semiconductor device of claim 11, wherein the fail detection circuit comprises:

a row control circuit configured to latch the row addresses to generate pre-row addresses, and generate a reset signal that is enabled when the row addresses input after generating the pre-row addresses and pre-row addresses have different combinations;

a column control circuit configured to latch the column addresses when the correction enable signal is enabled to generate pre-column addresses, and generate a comparison signal that is enabled when column addresses input after generating the pre-column addresses and the pre-column addresses have different combinations; and a flag signal generation circuit configured to count a counting signal when the correction enable signal is enabled and the comparison signal is enabled, and generate the flag signal that is enabled when the counting signal is counted the set number of times.

13. The semiconductor device of claim 12, wherein the column control circuit is configured to initialize the pre-column addresses when the reset signal is enabled, and wherein the flag signal generation circuit is configured to initialize the counting signal when the reset signal is enabled.

14. The semiconductor device of claim 12, wherein the row control circuit comprises:

a row register configured to latch the row addresses to generate the pre-row addresses; and a row comparison circuit configured to generate the reset signal that is enabled when the row addresses and the pre-row addresses have different combinations.

15. The semiconductor device of claim 12, wherein the column control circuit comprises:

a column register configured to latch the column addresses to generate the pre-column addresses when the correction enable signal is enabled, and initialize the pre-column addresses when the reset signal is enabled;

a column comparison circuit configured to generate a column detection signal that is enabled when the column addresses and the pre-column addresses have different combinations; and a comparison signal generation circuit configured to generate the comparison signal, based on the column detection signal when the correction enable signal is enabled.

16. The semiconductor device of claim 12, wherein the flag signal generation circuit comprises:
a counting circuit configured to generate the counting signals that sequentially counted when the correction enable signal is enabled and the comparison signal is enabled, and initialize the counting signals when the reset signal is enabled; and
a counting signal detection circuit configured to generate the flag signal when the counting signals are counted the set number of times.

17. A semiconductor device comprising:
an error correction circuit configured to correct an error of internal data, based on the internal data output from a memory cell selected based on row addresses having different combinations and column addresses and an internal parity to generate data, and generate a correction enable signal when the error of the internal data is correctable; and
a fail detection circuit configured to latch the row addresses having different combinations in one combination of the column addresses whenever the correction enable signal is enabled, and generate a flag signal that is enabled when the row addresses having different combinations are latched a set number of times,
wherein the fail detection circuit is configured to enable the flag signal when the error in the internal data output by the row addresses having different combinations in one combination of the column addresses is corrected the set number of times.

18. The semiconductor device of claim 17, wherein the fail detection circuit comprises:
a column control circuit configured to latch the column addresses to generate pre-column addresses, and generate a reset signal that is enabled when the column addresses input after generating the pre-column addresses and the pre-column addresses have different combinations;
a row control circuit configured to latch the row addresses when the correction enable signal is enabled to generate pre-row addresses, and generate a comparison signal that is enabled when the row addresses input after generating the pre-row addresses and the pre-row addresses have different combinations; and a flag signal generation circuit configured to count a counting signal when the correction enable signal is enabled and the comparison signal is enabled, and generate the flag signal that is enabled when the counting signal is counted a set number of times.

19. The semiconductor device of claim 18,
wherein the row control circuit is configured to initialize the pre-row addresses when the reset signal is enabled, and
wherein the flag signal generation circuit is configured to initialize the counting signal when the reset signal is enabled.

20. The semiconductor device of claim 18, wherein the column control circuit comprises:
a column register configured to latch the column addresses to generate the pre-column addresses; and
a column comparison circuit configured to generate the reset signal that is enabled when the column addresses and the pre-column addresses have different combinations.

21. The semiconductor device of claim 18, wherein the row control circuit comprises:
a row register configured to latch the row addresses to generate the pre-row addresses when the correction enable signal is enabled, and initialize the pre-row addresses when the reset signal is enabled;
a column comparison circuit configured to generate a column detection signal that is enabled when the column addresses and the pre-column addresses have different combinations; and
a comparison signal generation circuit configured to generate the comparison signal based on the column detection signal when the correction enable signal is enabled.

22. The semiconductor device of claim 18, wherein the flag signal generation circuit comprises:
a counting circuit configured to generate the counting signals that sequentially counted when the correction enable signal is enabled and the comparison signal is enabled, and initialize the counting signals when the reset signal is enabled; and
a counting signal detection circuit configured to generate the flag signal when the counting signal is counted the set number of times.

* * * * *